United States Patent [19]
Park

[11] Patent Number: 5,880,543
[45] Date of Patent: *Mar. 9, 1999

[54] SPINDLE MOTOR HAVING LABYRINTH SEAL

[75] Inventor: Il Oung Park, Seoul, Rep. of Korea

[73] Assignee: Samsung Electro-Mechanics Co. Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 692,530

[22] Filed: Aug. 6, 1996

[30] Foreign Application Priority Data

May 29, 1996 [KR] Rep. of Korea ............... 1996-18437

[51] Int. Cl.$^6$ ........................................ H02K 7/00
[52] U.S. Cl. .................. 310/67 R; 310/90; 310/156; 310/261
[58] Field of Search ............................ 310/67 R, 90

[56] References Cited

U.S. PATENT DOCUMENTS

| | | | |
|---|---|---|---|
| 5,214,326 | 5/1993 | Yonei | 310/67 R |
| 5,281,886 | 1/1994 | Ohta | 310/90 |
| 5,347,189 | 9/1994 | Chuta et al. | 310/90 |
| 5,402,023 | 3/1995 | Nakanishi et al. | 310/90 |
| 5,448,119 | 9/1995 | Kono et al. | 310/67 R |
| 5,483,113 | 1/1996 | Sakuragi et al. | 310/67 R |

*Primary Examiner*—Nestor Ramirez
*Assistant Examiner*—Elvin G. Enad
*Attorney, Agent, or Firm*—Ladas & Parry

[57] ABSTRACT

The invention relates to a structure of a spindle motor. The spindle motor comprises a housing assembly; a shaft fixed to the center portion of the housing assembly, a stator secured to the housing assembly around the shaft, a spindle hub having an inner cylindrical portion and an outer cylindrical portion, a rotor magnet secured to a circumferential inner surface of the outer cylindrical portion of the spindle hub, and a pair of bearings provided around the shaft in the inner cylindrical portion; wherein the spindle hub has a flat plate portion formed in the center part thereof and the flat plate portion has an opening through which the shaft is passed, thereby the flat plate portion functions as a labyrinth seal.

10 Claims, 4 Drawing Sheets

SPINDLE MOTOR HAVING LABYRINTH SEAL

BACKGROUND OF THE INVENTION

1. Field of the Invention

The present invention relates to a spindle motor, and more particularly to a spindle motor in which a labyrinth seal is integrally formed with a spindle hub to prevent lubricant particles used in a bearing from being dispersed toward a neighboring clean area.

2. Description of the Prior Art

Generally, a spindle motor used in a magnetic recorder/reproducer such as a hard disk drive (HDD) and the like, has a pair of bearings b as shown in FIG. 1. Each bearing b is disposed in upper and lower portions of a shaft a and contains lubricant, for example, grease. When the bearings b containing the lubricant are rotated at a high speed, the lubricant is dispersed as fine particles or liquid-drops. If the lubricant particles are transferred to a clean area c and deposited on a disk d, an error can be caused upon a reading/writing operation on the disk d, and the life time of the disk d becomes shortened. Accordingly, respective bearings b are provided with a sealing member for preventing the dispersed lubricant particles from flowing into the clean area c. As the sealing member, a labyrinth seal s1 as shown in FIG. 1 or a magnet fluid seal s2 as shown in FIG. 2 is predominantly used. While the magnet fluid seal s2 provides an excellent sealing effect, it suffers from drawbacks in that when the spindle motor is rotated at a speed exceeding a predetermined speed, fluid magnet is apt to be dispersed to seperate from the bearings b. Also, since the magnet fluid seal s2 is separately manufactured from the spindle hub, the number of parts needed to construct the magnet fluid seal s2 is increased, manufacturing cost becomes high, assembling operations are required, and productivity is deteriorated.

Moreover, while the labyrinth seal s1 is inexpensive when compared to the magnet fluid seal s2, it still suffers from drawbacks in that since it is also separately manufactured from the spindle hub, assembling operations are required when the labyrinth seal s1 is interference-fitted on the spindle hub, and thereby productivity is also deteriorated.

Another labyrinth seal is disclosed in the Japanese Patent Laid-Open Gazette No. 7-286619. In the labyrinth seal disclosed in the Japanese Patent Gazette, a spindle motor which has a compact size and includes a magnetic fluid seal is is provided. However, since the magnetic fluid seal and a projection formed in a rotor hub are simultaneously provided to ensure the performance of the magnetic fluid seal, the number of parts needed to construct the labyrinth seal is increased, and substantial construction and assembling operations are required which reduces productivity.

SUMMARY OF THE INVENTION

Accordingly, the present invention has been made in an effort to solve the problems occurring in the prior art, and an object of the present invention is to provide a spindle motor in which a labyrinth seal is integrally formed with the spindle hub to prevent lubricant particles used in a bearing from being dispersed toward a neighboring clean area, and thereby the number of parts and assembling operations can be decreased to improve productivity.

According to one aspect of the present invention, there is provided a spindle motor comprising:

a housing assembly;

a shaft fixed to the center portion of the housing assembly;

a stator secured to the housing assembly around the shaft;

a spindle hub having an inner cylindrical portion and an outer cylindrical portion;

a rotor magnet secured to a circumferential inner surface of the outer cylindrical portion of the spindle hub; and a pair of bearings provided around the shaft in the inner cylindrical portion;

wherein the spindle hub has a flat plate portion formed in the center part thereof and the flat plate portion has an opening through which the shaft is passed, and thereby the flat plate portion functions as a labyrinth seal.

According to another aspect of the present invention, a wall portion defining the opening approaches the outer surface of the shaft as close as possible while not contacting the outer surface of the shaft.

According to another aspect of the present invention, a lower surface of the flat plate portion is formed with a stepped portion for limiting upward movement of an upper bearing to some extent.

According to another aspect of the present invention, an annular projection and an annular groove are formed in the wall portion defining the opening to further increase the sealing effect.

According to another aspect of the present invention, a threaded portion is formed in the wall portion defining the opening to further increase the sealing effect.

According to another aspect of the present invention, a pair of bearings are fitted onto the shaft from the bottom.

According to still another aspect of the present invention, a spacer member is disposed between the pair of bearings to keep the distance between the bearings a constant.

By the features of the present invention, since a separate labyrinth seal is not needed, the number of parts needed to construct the spindle motor is decreased to improve productivity.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Hereinafter, spindle motors in accordance with preferred embodiments of the present invention will be described in greater detail with reference to the drawings.

Figure 1:
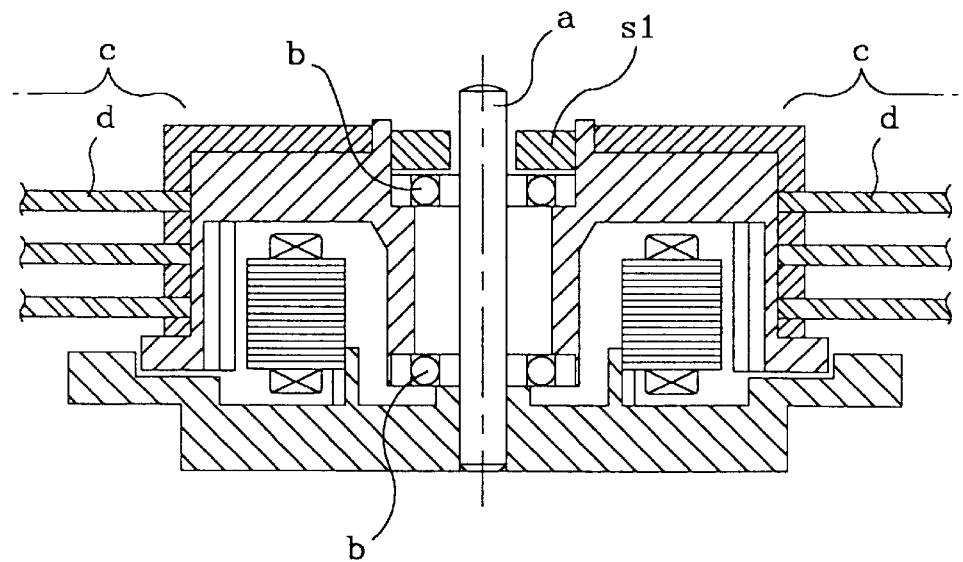
FIG. 1 is a cross-sectional view of a conventional spindle motor having a labyrinth seal.
Figure 2:
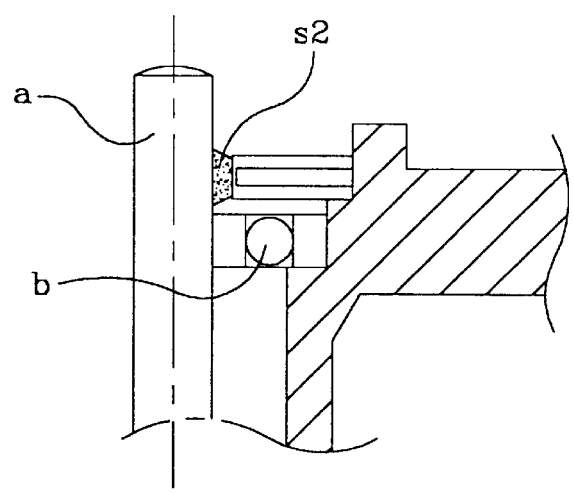
FIG. 2 is a cross-sectional view of another conventional spindle motor having a magnet fluid seal.
Figure 3:
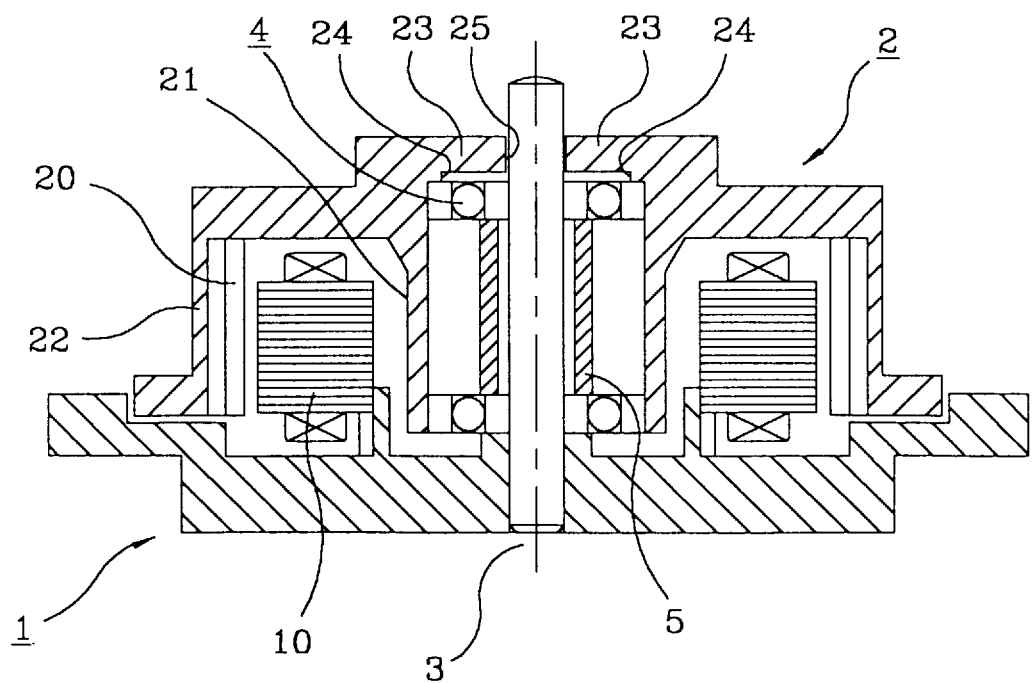
FIG. 3 is a cross-sectional view of a spindle motor in accordance with one embodiment of the present invention.
Figure 4:
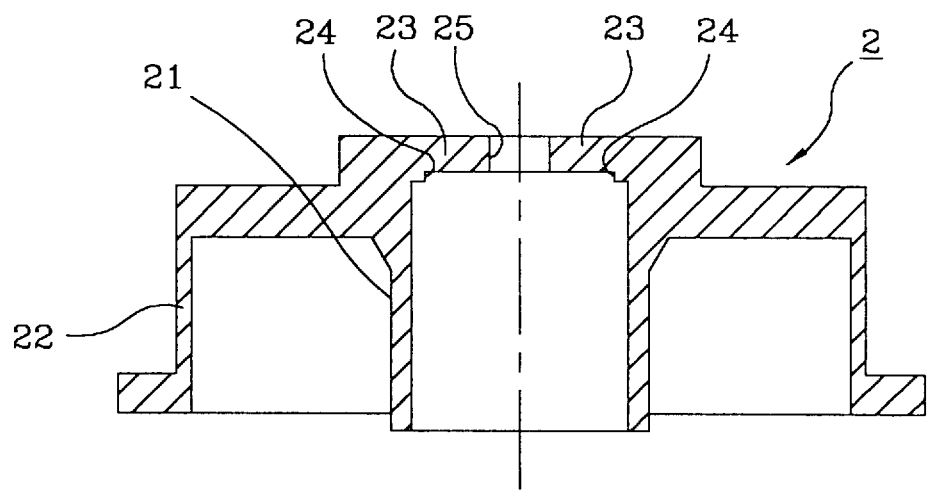
FIG. 4 is a cross-sectional view of a spindle hub used in the spindle motor of FIG. 3.

Referring to FIGS. 3 and 4, a spindle motor according to the present invention includes a housing assembly 1, a spindle hub 2 and a shaft 3. The shaft 3 is secured in the center of the housing assembly 1, and a stator 10 is secured to the housing assembly 1 around the shaft 3. The spindle hub 2 is arranged above the housing assembly 1 and rotatably receives the shaft 3 via a pair of bearings 4. The spindle hub 2 is formed with an inner cylindrical portion 21 into which the pair of bearings 4 are inserted, and an outer cylindrical portion 22 to the inner circumferential surface of which a rotor magnet 20 is secured.

A flat plate portion 23 having a desired thickness is formed in a center section of the spindle hub 2 above the inner cylindrical portion 21. In the center of the flat plate portion 23, there is an opening 25 for allowing the shaft 3 to pass therethrough. The flat plate portion 23 closes the upper end of the inner cylindrical portion 21 to function as a labyrinth seal.

Since the upper end of the inner cylindrical portion 21 is closed by the flat plate portion 23 integrally formed on the spindle hub 2, the pair of bearings 4 cannot be inserted into the inner cylindrical portion 21 from the top. Accordingly, the pair of bearings 4 have to be inserted into the inner cylindrical portion 21 from the bottom. To this end, the lower end of the inner cylindrical portion 21 has an inner diameter which is not less than the outer diameter of the bearings 4, the inner diameter having a precise allowance range to ensure that the bearings 4 are interference-fitted into the inner cylindrical portion 21. The lower surface of the flat plate portion 23 is formed with a stepped portion 24 to limit the upward movement of the upper bearing 4 to some extent. It is preferable that the inner diameter of the opening 25 approaches the diameter of the shaft 3 as closely as possible while not contacting the shaft 3. A spacer member 5 is disposed between the pair of bearings 4 to keep the distance therebetween a constant.

Figure 5:
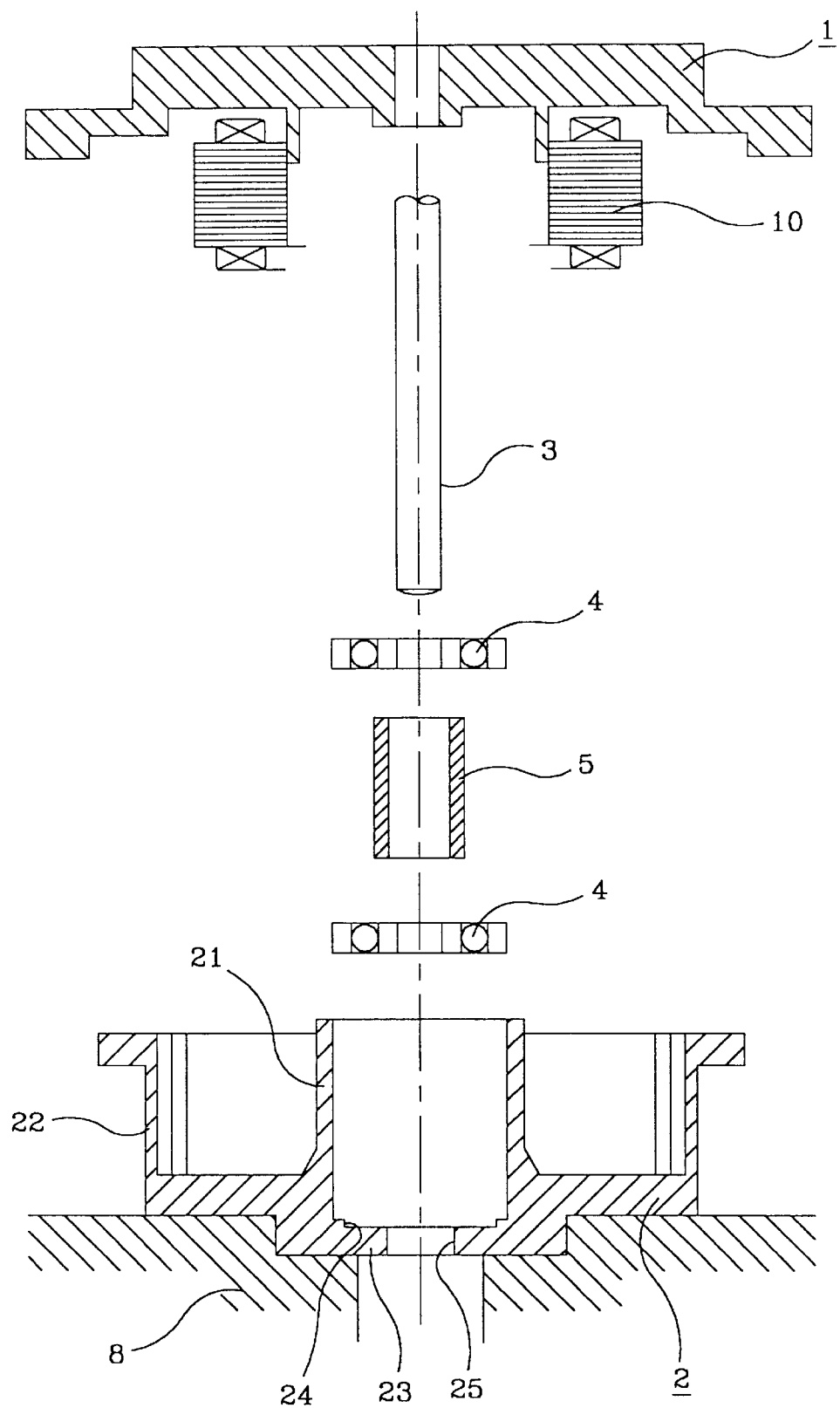
FIG. 5 is an exploded cross-sectional view of the spindle motor of FIG. 3.

Hereinbelow, the assembly and operation of the spindle motor constructed as described above will be given with reference to FIG. 5.

After the spindle hub 2 is positioned upside down on an assembling jig 8, the upper bearing 4 is fitted into the inner cylindrical portion 21 up to the stepped portion 24, the spacer member 5 is inserted, and then the lower bearing 4 is fitted into the inner cylindrical portion 21. Thereafter, the shaft 3 is inserted through the pair of bearings 4, and the housing assembly 1 is secured to the shaft 3 to complete the assembly operation.

The spindle motor of the present invention assembled as mentioned above can rotate around the shaft 3 in a state as shown in FIG. 3. Since the flat plate portion 23 integrally formed with the spindle hub 2 in the center thereof closes the upper part of the upper bearing 4, lubricant in the bearing 4 cannot flow into a clean area on a disk even when being dispersed.

Figure 6:
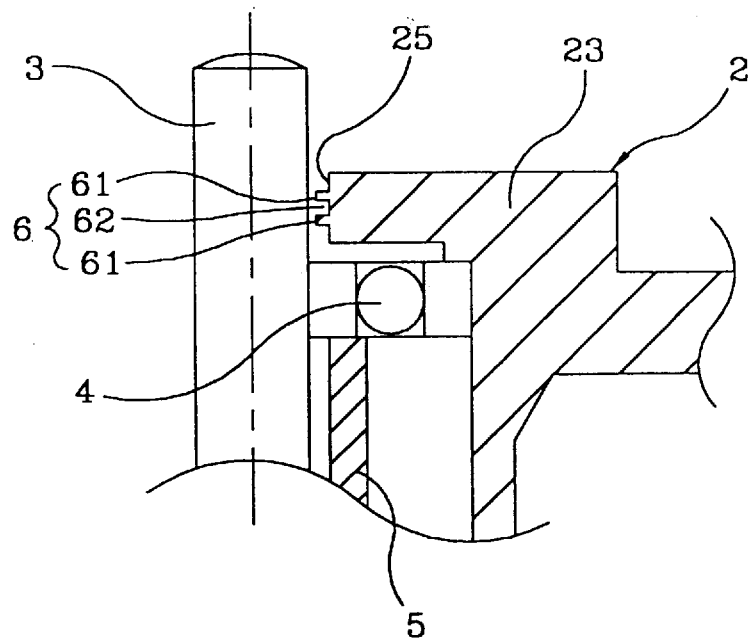
FIG. 6A is a partial enlarged cross-sectional view of another spindle motor in accordance with another embodiment of the present invention.
FIG. 6B is a partial enlarged cross-sectional view of another spindle motor in accordance with still another embodiment of the present invention.
Figure 6:
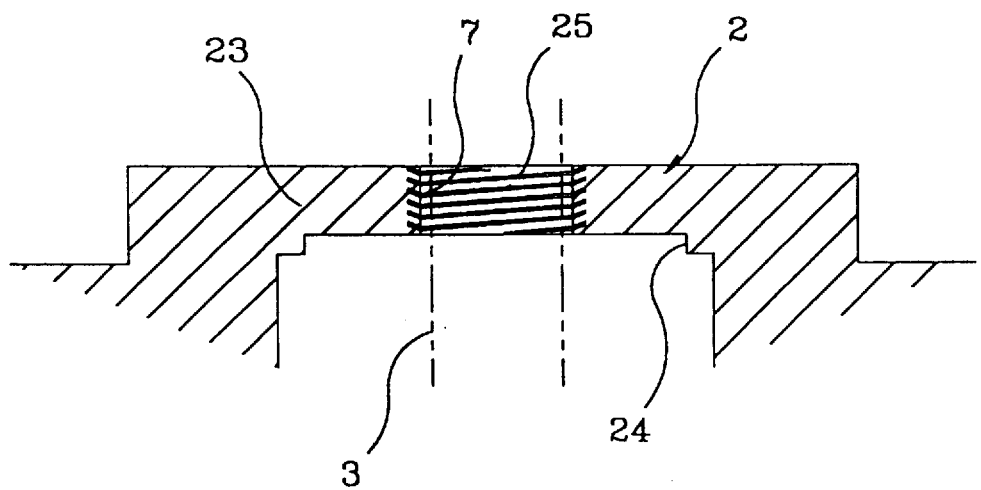

The spindle motor of the present invention can be embodied otherwise, as shown in FIGS. 6A and 6B.

Referring now to FIG. 6A, an unevenness portion 6 in which an annular projection 61 and an annular groove 62 are repeatedly formed is provided in the wall defining the opening 25. By this, a vortex flow is produced between the annular projection 61 and groove 62 and the shaft 3, to further prevent lubricant particles from leaking outside.

Referring to FIG. 6B, a threaded portion 7 is formed in the wall defining the opening 25. When the hub 2 is rotated, air is forced to flow downward along the threaded portion 7 to prevent lubricant particles from leaking outside.

As a result, according to the present invention, since the flat plate portion 23 is integrally formed with the spindle hub 2 and the opening 25 is defined in the center of the flat plate portion 23 to allow the shaft 3 to pass through the flat plate, a separate labyrinth seal is not needed. Accordingly, the number of parts needed to construct the spindle motor is decreased to improve productivity. This construction results from the fact that the upper and lower bearings 4 can be fitted from the bottom into the inner cylindrical portion 21. In addition, since the opening 25 is formed with the uneven portion 6 or the threaded portion 7, dispersion of lubricant particles is effectively prevented.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A spindle motor comprising:

a housing assembly;

a shaft fixed to a center portion of the housing assembly, a stator secured to the housing assembly around the shaft;

a spindle hub having an inner cylindrical portion and an outer cylindrical portion, said stator being disposed between said inner and outer cylindrical portions;

a rotor magnet secured to a circumferential inner surface of the outer cylindrical portion of the spindle hub; and upper and lower bearings press fit on and around the shaft and press fit in the inner cylindrical portion of said spindle hub;

wherein the spindle hub includes an integrally formed flat plate portion in a center part of the hub, said flat plate portion having an opening through which the shaft is passed, said flat plate portion having a surface bounding said opening which surrounds and faces said shaft to function as a labyrinth seal which is integral with said hub, said flat plate portion having a lower surface with an integral stepped portion against which said upper bearing abuts and is limited in upward movement in a spaced position from said labyrinth seal.

2. A spindle motor as claimed in claim 1, wherein said wall surface approaches an outer surface of the shaft as closely as possible while not contacting the outer surface of the shaft.

3. A spindle motor as claimed in claim 2, wherein an annular projection and an annular groove are formed in said wall surface to further increase sealing effect.

4. A spindle motor as claimed in claim 2, wherein a threaded surface is formed in said wall surface to further increase sealing effect.

5. A spindle motor as claimed in claim 1, wherein said upper and lower bearings are fitted onto the shaft from the bottom at the housing assembly side.

6. A spindle motor as claimed in claim 1, comprising a spacer member disposed between said upper and lower bearings to abut against the bearings and hold the bearings at a constant spacing therebetween.

7. A spindle motor as claimed in claim 1, wherein said inner cylindrical portion has a flat inner cylindrical surface, said bearings having outer portions which are interference fit against said flat inner cylindrical surface, said bearings having inner portions which are interference fit on said shaft.

8. A spindle motor as claimed in claim 7, wherein said flat plate portion extends radially inwards as a raised portion on said hub portion to receive said shaft in said opening, said flat plate portion overlying and covering an upper one of said bearings.

9. A spindle motor as claimed in claim 1, wherein said stepped portion provides a vertical projection having a lower surface against which said upper bearing abuts.

10. A spindle motor as claimed in claim 1, wherein said inner cylindrical portion has an open lower end through which said upper and lower bearings are inserted and are press fit against said inner cylindrical portion, said stator surrounding said inner cylindrical portion and said upper and lower bearings therein.

* * * * *